(12) United States Patent
Bekiarian et al.

(10) Patent No.: US 6,777,515 B2
(45) Date of Patent: Aug. 17, 2004

(54) FUNCTIONAL FLUORINE-CONTAINING POLYMERS AND IONOMERS DERIVED THEREFROM

(75) Inventors: Paul Gregory Bekiarian, Wilmington, DE (US); William Brown Farnham, Hockessin, DE (US)

(73) Assignee: I. du Pont de Nemours and Company, Wilmington, DE (US)

(*) Notice: Subject to any disclaimer, the term of this patent is extended or adjusted under 35 U.S.C. 154(b) by 14 days.

(21) Appl. No.: 10/187,555

(22) Filed: Jul. 2, 2002

(65) Prior Publication Data

US 2003/0045662 A1 Mar. 6, 2003

Related U.S. Application Data

(60) Provisional application No. 60/305,069, filed on Jul. 13, 2001.

(51) Int. Cl.$^7$ .................................................. C08F 114/18
(52) U.S. Cl. .......................................... 526/243; 526/79
(58) Field of Search .................................... 526/243, 74

(56) References Cited

U.S. PATENT DOCUMENTS

| | | | |
|---|---|---|---|
| 6,025,092 A | 2/2000 | Doyle et al. | |
| 6,140,436 A | 10/2000 | Doyle et al. | |

FOREIGN PATENT DOCUMENTS

| | | |
|---|---|---|
| WO | WO 9945048 | 9/1999 |
| WO | WO 0052060 | 9/2000 |
| WO | WO 0149757 | 7/2001 |

Primary Examiner—Bernard Lipman

(57) ABSTRACT

This invention concerns functional fluorine-containing copolymers compositions and ionomers derived therefrom. The ionomers formed are useful in electrochemical applications such as batteries, fuel cells, in exchange membranes, sensors and the like.

31 Claims, No Drawings

FUNCTIONAL FLUORINE-CONTAINING POLYMERS AND IONOMERS DERIVED THEREFROM

FIELD OF THE INVENTION

This invention concerns functional fluorine-containing copolymers compositions and ionomers derived therefrom. The ionomers formed are useful in electrochemical applications such as batteries, fuel cells, in exchange membranes, sensors and the like.

TECHNICAL BACKGROUND

International Publication number WO 99/45048 discloses substantially fluorinated but not perfluorinated ionomers and related ionic and nonionic monomers having pendant groups containing fluorosulfonyl methide or fluorosulfonyl imide derivatives and univalent metal salts thereof.

International Application No. PCT/US00/05,526 teaches a polymerization process for forming a copolymer comprising: co-polymerizing in aqueous emulsion one or more monomers selected from the group consisting of tetrafluoroethylene, trifluoroethylene, vinylidene fluoride, vinyl fluoride, ethylene, chlorotrifluoroethylene, hexafluoropropylene, hexafluoroisobutylene, perfluoromethyl vinyl ether, and perfluoroethyl vinyl ether with a fluorinated co-monomer having limited water solubility, said comonomer being dispersed in the form of droplets of a size of 10 microns or less, said polymerization process being conducted in the presence of a fluorinated surfactant and a free-radical initiator.

The present application copolymerizes the polymers produced by the above disclosures using a new method and produces co-polymers with novel properties.

SUMMARY OF THE INVENTION

The present invention provides for a polymer composition comprising a polymer, I, and the alkali metal sulfonate, ammonium sulfonate, sulfonic acid, and sulfonyl methide, both acid and salt, derivatives thereof, said polymer, I,

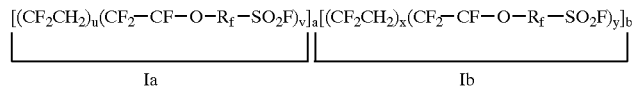

comprising an amorphous segment, Ia, and a crystalline segment, Ib, wherein $R_f$ is a linear or branched perfluoroalkenyl or perfluoroalkenyl ether diradical, the ratio u:v is in the range of 85:15 to 50:50, preferably 83:17 to 64:36, the ratio x:y is in the range of 100:0 to 87:13, preferably 100:0 to 93:7; said polymer being a copolymer of monomers IIa and IIb,

     IIa

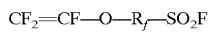     IIb and wherein the ratio a:b is such that the overall concentration of monomer units derived from monomer IIb in said polymer is in the range of 6 mole % to 12 mole % said polymer being characterized in that the melting point thereof lies above the melting point of a fully random copolymer of monomers IIa and IIb of the same overall composition, and lies at least 5° C. below the melting point of poly(vinylidene fluoride).

Further provided in the present invention is a process for forming a graft copolymer of the formula I, the process comprising combining the monomer IIb at a concentration of 0.2 to 0.6 g/ml with water and a fluorosurfactant and agitating said combination to form an emulsion having a droplet size of no greater than 0.5 micrometers;

in a reaction vessel, combining in water said emulsion with monomer IIa at a first monomer concentration ratio and a free-radical initiator;

allowing said monomers to polymerize to form a first copolymer which may be amorphous or crystalline;

in a reaction vessel which may be the same or different, combining in water said first copolymer with an additional amount of said emulsion of monomer IIb and an additional amount of monomer IIa, at a second monomer concentration ratio, and an additional amount of a free radical initiator, and allowing said further amounts of monomer to polymerize to form a second copolymer, said second copolymer being crystalline if said first copolymer is amorphous and said second copolymer being amorphous if said first copolymer is crystalline;

wherein said first and second concentration ratios of monomer IIa to monomer IIb are in the range of 85:15 to 50:50 on a molar basis when the desired copolymer is amorphous, and in the range of 100:0 to 87:13 when the desired polymer is crystalline;

and, wherein the ratio of amorphous polymer concentration to crystalline polymer concentration is controlled so that the overall concentration of monomer units derived from monomer IIb is in the range of 6–12 mole %.

Further provided in the present invention is an electrochemical cell comprising an anode, a cathode, and a separator wherein at least one of said anode, cathode, or separator comprises the alkali sulfonate, ammonium sulfonate, sulfonic acid, or sulfonyl methide derivative of polymer I.

DETAILED DESCRIPTION OF THE INVENTION

It is well-known in the art that polymers having abstractable hydrogens along the backbone are in general well-disposed to undergo grafting when exposed to a source of free radicals and a polymer or monomer having unsaturation. In the present invention is provided a process for forming a graft polymer, I, comprising an amorphous polymer portion, Ia, and a crystalline polymer portion, Ib. Also contemplated in the present invention are the sulfonate, sulfonic acid, and methide derivatives of I shown as III and IV, where M is alkali metal, ammonium, or hydrogen. Particularly preferred embodiments have M as lithium, ammonium, or hydrogen.

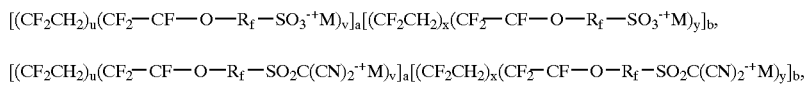

$$[(CF_2CH_2)_u(CF_2-CF-O-R_f-SO_2C(CN)_2^{-+}M)_v]_a[(CF_2CH_2)_x(CF_2-CF-O-R_f-SO_2C(CN)_2^{-+}M)_y]_b, \quad \text{IV}$$

The copolymer I of the present invention is a copolymer of vinylidene fluoride, IIa, with a fluorosulfonyl fluorovinyl ether, IIb.

In the polymer of the invention, $R_f$ is a linear or branched perfluoroalkenyl or perfluoroalkenyl ether diradical. According to the process of the invention, an amorphous copolymer is formed by combining monomer IIa with monomer IIb in a relative concentration ratio, u:v referring to I, in the range of 85:15 to 50:50, preferably 83:17 to 64:36. Further according to the process of the invention a crystalline copolymer is formed by combining monomer IIa with monomer IIb in a relative concentration ratio, x:y, referring to I, in the range of 100:0 to 87:13, preferably 100:0 to 93:7. Further according to the process of the invention, the ratio of the concentration of the amorphous polymer to the concentration of crystalline polymer, of "a" to "b" referring to I, is in the range of 94:6 to 88:12 preferably 92:8 to 90:10.

The process of the present invention provides a two-stage polymerization process. In one embodiment, in a first stage is prepared the amorphous polymer, and in a second stage is prepared the crystalline polymer in the presence of the previously prepared amorphous polymer. In a second embodiment, in a first stage is prepared the crystalline polymer, and in a second stage is prepared the amorphous polymer in the presence of the previously prepared crystalline polymer. The graft copolymer of the present invention is formed in the process of free-radical addition polymerization to prepare the amorphous polymer in the presence of the previously prepared crystalline polymer, or, in the alternative, to prepare the crystalline polymer in the presence of the previously prepared amorphous polymer.

The graft copolymers of the invention, I, and the derivatives III–VI, exhibit several properties which are surprising over those exhibited by other combinations of comparable composition which have not been prepared according to the process of the present invention. For example, a graft copolymer formed according to the process of the present invention exhibits a higher melting point than that exhibited by a fully random copolymer having the same over-all composition. In a related example, a graft copolymer formed according to the process of the present invention exhibits a melting point at least 5° C. lower than that of neat poly (vinylidene fluoride). In a further example, a graft copolymer formed according to the process of the present invention exhibits a lower tensile modulus and a higher elongation to break—that is greater ductility and toughness—than are exhibited by a polymeric composition identical compositionally in every respect to the graft copolymer but prepared from separately polymerized crystalline and amorphous polymer components.

For the purposes of the present invention, the term "crystalline polymer" refers not only to a solid polymer which exhibits a melting endotherm, but also to the same polymer in the molten state or dissolved state wherein in the latter two cases it might be more descriptive to refer to the polymer as crystallizable rather than crystalline. The thermal properties of the polymers of the invention are determined by differential scanning calorimetry according to ASTM D-3417-83 modified in that the heating rate is 20° C./min. The melting point is taken as the peak of the melting endotherm. The glass transition temperature is taken as the midpoint of the measured transition. For the purposes of the present invention, the crystalline polymer according to the present invention exhibits a heat of fusion of at least 1 J/g, preferably at least 5 J/g associated with a melting point of at least 35° C. For the further purposes of the present invention, the amorphous polymer according to the present invention does not exhibit a heat of fusion equal to or greater than 1 J/g; preferably the heat of fusion is less than 0.5 J/g with a melting point of 35° C. or more, preferably 100° C. or more. Also the amorphous polymeric portion or amorphous polymer shall not have a glass transition temperature above 35° C., preferably not above 10° C.

The 2-stage polymerization process of the present invention is typically conducted in aqueous emulsion in the presence of a fluorocarbon surfactant such as ammonium perfluorooctanoate or ammonium perfluorononanoate. A buffer agent may be employed to maintain the pH of the reaction mixture at about or below pH 7 to prevent undesirable hydrolysis of the fluorine-containing monomers before their polymerization into copolymer. The 2-stage polymerization process of the present invention may be conducted at pressures of 345 kPa (50 psig) to 2.76 MPa (400 psig), preferably 2.07 MPa (300 psig), and at temperatures of 35° C. to 100° C., preferably 60° C., using an inorganic thermal initiator such as potassium persulfate or an inorganic redox initiator pair such as ammonium persulfate/sodium sulfite. The 2-stage polymerization process of the present invention may be conducted as a semi-batch process in which a fraction of the total amount of monomers IIa and IIb is charged to the reaction vessel containing water and optionally surfactant and optionally a buffer agent. Depending on the polymerization temperature selected, initiator is either charged or continuously fed to initiate and sustain the polymerization. The 2-stage polymerization process of the present invention may be conducted in the presence of a suitable chain-transfer agent introduced during stage-1 or during stage-2 or continuously added during the entire polymerization process or some fraction thereof to limit and control polymer molecular weight and viscosity.

In order for the 2-stage polymerization process to proceed in a satisfactory manner it is necessary that monomer IIb first be emulsified in a mixture of water and a fluorosurfactant, preferably ammonium perfluorooctanoate, to form an emulsion containing 0.02 g/ml to 0.06 g/ml, preferably 0.044 g/ml of ammonium perfluorooctanoate surfactant, and 0.2 g/ml to 0.6 g/ml of IIb, preferably 0.5 g/ml IIb, with a droplet size of about 0.5 micrometers or less.

In a preferred embodiment of the invention vinylidene fluoride (VF2), and PSEPVE are copolymerized. A polymerization vessel containing water and ammonium perfluorooctanoate is pressurized to ca. 2.07 MPa (300 psig) by the introduction of a portion of the total amount of VF2 and PSEPVE. Polymerization is started in the presence of a free-radical initiator. For stage-1 of the 2-stage polymerization process, mixtures of VF2 and emulsified PSEPVE are fed at about the rate at which they are consumed to produce an amorphous polymeric portion comprising 15 mole % to 50 mole % of PSEPVE, preferably 17 mole % to 36 mole %. For stage-2 of the 2-stage polymerization process, the proportions of VF2 and PSEPVE fed to the polymerization vessel are then changed to correspond to the composition of the desired crystalline polymer, and the polymerization is continued, feeding VF2 and emulsified PSEPVE at about the rate they are consumed, to produce a crystalline polymeric portion, containing 0 mole % to 13 mole % of PSEPVE preferably 0 mole % to 7 mole % of PSEPVE. During formation of the crystalline polymer in this embodiment of the invention, grafting takes place on to the amorphous polymer backbone simultaneously with the forming of the crystalline polymer. The weight fraction of stage-1 and stage-2 polymers are chosen to produce an overall concentration of 6 mole % to 12 mole % of PSEPVE preferably 8 mole % to 10 mole % PSEPVE.

In a second preferred embodiment of the invention, copolymer compositions I were prepared by the novel 2-stage aqueous polymerization process as follows. A fraction of the total amount of VF2 and PSEPVE is charged to a pressure of ca. 2.07 MPa (300 psig) into a suitable polymerization vessel containing water and fluorocarbon surfactant at ca. 60° C. and polymerization is started in the presence of a free-radical initiator. For stage-1 of the 2-stage polymerization process, mixtures of VF2 and emulsified PSEPVE are fed at about the rate at which they are consumed to produce a crystalline polymer, comprising 1 mole % to 13 mole % PSEPVE preferably 3 mole % to 7 mole % PSEPVE. For stage-2 of the 2-stage polymerization process, the proportions of VF2 and PSEPVE fed to the polymerization are changed to correspond to the composition of the desired amorphous copolymer, and the polymerization is continued, feeding VF2 and emulsified PSEPVE at about the rate they are consumed, to produce an amorphous polymer containing 15 mole % to 50 mole % PSEPVE preferably 17 mole % to 36 mole % PSEPVE, which interacts, during it's formation, with the crystalline polymeric portion to produce the composition I. The weight fraction of stage-1 and stage-2 are chosen to produce a composition I containing 6 mole % to 12 mole % PSEPVE preferably 8 mole % to 10 mole % PSEPVE. During formation of the amorphous polymer in this embodiment of the invention, grafting takes place on to the crystalline polymer backbone simultaneously with the forming of the amorphous polymer.

The product of the process of the invention is in the form of a fine-particle, milky-white aqueous polymer latex or dispersion. The polymer I can be isolated from the latex by any one of a number of standard methods for polymer latex coagulation known to the art. Examples of polymer latex coagulation useful for the isolation of polymer compositions I include, but are not limited to, addition of concentrated mineral acid to the latex, addition of divalent and trivalent metal cation salts to the latex, or freezing the polymer latex to effect agglomeration of the fine latex particles into larger-sized polymer aggregates which separate from the aqueous medium and could then be easily washed and filtered. The final form of the washed, isolated polymer is typically a fine powder to a coarse granular powder and can be easily and conveniently dried by the application of modest heat accompanied by the application of partial vacuum and a flow of inert gas to aid in the drying process. The polymer compositions I show a glass transition temperature below room temperature, preferably below 10° C., and a melting point in the range of 100° C. to 171° C. Compositions I can be molded into dense translucent slabs and films by standard thermoplastic processing techniques such as compression molding.

The sulfonyl fluoride moiety of polymer compositions I can be transformed into various ionomer forms by chemical means. The preferred lithium sulfonate form III can be obtained by treating I with a stoichiometric amount of lithium carbonate in methanol. The essential steps for producing III from I are described in Doyle et al, U.S. Pat. No. 6,025,092. The preferred lithium dicyanomethide form IV can be obtained by treating I with lithium hydride and 1,3-propanedinitrile in an aprotic solvent. The essential steps for producing IV from I are described in Feiring et al, International Publication WO 99/45048). Ionomer compositions III and IV are not readily melt processible in the dry salt form, however upon mixing III or IV with a suitable polar solvent or a mixture of suitable polar solvents, an ionomer gel composition can be formed which can be thermoformed into articles such as slabs, films and cords by standard thermoplastic processing techniques such as, but not limited to, compression molding, extrusion and calendering. Suitable polar solvents include but are not limited to water, alcohol, linear and cyclic carbonates and such other solvents as are taught in the art. While the ionic polymers of the present invention III and IV are inherently ionically conductive, when they are combined with polar solvents forming an ionically conductive composition the ionic conductivity increases by several orders of magnitude. Further improvements in ionic conductivity may be achieved by combining with the ionically conductive composition certain electrolyte salts such as are known in the art.

The ionically conductive compositions of the invention are useful in applications such as, but not limited to, a binder polymer for lithium ion battery electrodes or polymer gel electrolyte for lithium ion battery separator applications. The ionomers and ionically conductive compositions of the present invention may be employed as direct substitutes for the ionomers disclosed in Doyle et al, op.cit., and Feiring et al, op.cit.

The ammonium sulfonate form of III can be obtained by treating I with ammonium carbonate in methanol or methanol/water mixtures. The sulfonic acid form of III can be obtained by treating either the alkali metal or ammonium sulfonate form with mineral acid. Films of the sulfonic acid form of III when swollen with water, exhibit the property of proton conductivity which make them useful for applications in fuel cell technology such as the polymer electrolyte membrane and binder polymer for the membrane catalyst layer.

The invention herein is further described according to the following specific embodiments, but is not limited thereto.

EXAMPLES

In the following examples, all pressures are gauge pressures unless otherwise noted. Differential scanning calorimetry was employed according to the method of ASTM D-3417-83, except using a heating rate of 20° C./min. $T_m$ designates the melting point as determined at the peak of the melting endotherm. $\Delta H_f$ designates the heat of fusion. $T_g$ designates the glass transition temperature as determined at the midpoint of the transition. Tensile properties were measured according to ASTM D-412-92 except that sample thickness was about 0.025 in. and the grip separation rate was 2.0 in./min.

Abbreviations

The following terms and abbreviations are used in the examples. The abbreviation VF2 refers to the monomer 1,1-difluoroethene. The abbreviation PSEPVE refers to 2-[1-[difluoro[(trifluoroethenyl)oxy]methyl]-1,2,2,2- tetrafluoroethoxy]-1,1,2,2-tetrafluoroethanesulfonyl fluoride. The term PSVF2-methide ionomer refers to the lithium dicyanomethide derivative of PSEPVE propanedinitrile, [(2-(1-(difluoro((trifluoroethenyl)oxy)methyl)-1,2,2,2-tetrafluoroethoxy)-1,1,2,2-tetrafluoroethyl)sulfonyl]-, ion(−1), lithium salt. The term PSEPVE/VF2 copolymer refers to poly-ethanesulfonyl fluoride, 2-(1-(difluoro((trifluoroethenyl)oxy)methyl)-1,2,2,2-tetrafluoroethoxy)-1,1,2,2-tetrafluoro-/ethene, 1,1-difluoro-. Functional group transformation processes describe conversion of —$SO_2F$ moieties to —$SO_2C(CN)_2$ (−1) Li groups. The term PSVF2-methide ionomer refers to poly-ethanesulfonyl fluoride, 2-(1-(difluoro((trifluoroethenyl)oxy)methyl)-1,2,2,2-tetrafluoroethoxy)-1,1,2,2-tetrafluoro-/ethene, 1,1-difluoro-, aftertreated to propanedinitrile, [(2-(1-(difluoro((trifluoroethenyl)oxy)methyl)-1,2,2,2-tetrafluoroethoxy)-1,1,2,2-tetrafluoroethyl)sulfonyl]-, ion(−1), lithium salt.

Examples Index

| Example | subject |
| --- | --- |
| 1 | PSEPVE emulsions (0.5 g PSEPVE/ml) |
| 2 | 2-Stage PSVF2: stage-1 = 36 m %; stage-2 = 0 m % |
| 2a | Lithium sulfonate form of Example 2 |
| 2b | Sulfonic acid form of Example 2 |
| 3 | 2-Stage PSVF2: stage-1 = 25 m %; stage-2 = 0 m % |
| 4 | 2-Stage PSVF2: stage-1 = 20 m %; stage-2 = 0 m % |
| 5 | 2-Stage PSVF2: stage-1 = 17 m %; stage-2 = 0 m % |
| Comp-A | Random PSVF2: 8.9 m % |
| Comp-B | Precharge PSVF2: 8.3 m % |
| Comp-C | Blends of discrete stage-1 and stage-2 polymers |
| 6 | 2-Stage PSVF2: stage-1 = 36 m %; stage-2 = 3 m % |
| 6a | Lithium methide form of Example 6 |
| 7 | 2-Stage PSVF2: stage-1 = 36 m %; stage-2 = 5 m % |
| 8 | 2-Stage PSVF2: stage-1 = 36 m %; stage-2 = 7 m % |
| 9 | 2-Stage PSVF2: stage-1 = 20 m %; stage-2 = 1 m % |
| 9a | Lithium methide form of Example 9 |
| 10 | 2-Stage PSVF2: stage-1 = 20 m %; stage-2 = 3 m % |
| 10a | Lithium methide form of Example 10 |
| 11 | 2-Stage PSVF2: stage-1 = 20 m %; stage-2 = 5 m % |
| 11a | Lithium methide form of Example 11 |
| 12 | 2-Stage PSVF2: stage-1 = 20 m %; stage-2 = 7 m % |
| 13 | 2-Stage PSVF2: stage-1 = 3 m %; stage-2 = 20 m % |
| 14 | 2-Stage PSVF2: stage-1 = 5 m %; stage-2 = 20 m % |
| 15 | 2-Stage PSVF2: stage-1 = 7 m %; stage-2 = 20 m % |

Example 1
Preparation of PSEPVE Emulsions (0.5 g PSEPVE/ml)

The reservoir of a MicroFluidizer™ Model 110T, obtained from Microfluidics, Inc., was charged with a solution of 22 g ammonium perfluorooactanoate in 260 ml demineralized water. The pump was started and the fluids allowed to recycle to mix the surfactant solution. PSEPVE (250 g) was added slowly to the reservoir and the system allowed to recycle for 20 min to produce a well dispersed PSEPVE emulsion. The outflow was then directed to a 500 ml volumetric flask. After the reservoir was pumped down, demineralized water was added and pumped through the system to flush the remaining PSEPVE emulsion through and bring the level in the volumetric flask up to the mark. The emulsion was translucent blue as it exited the MicroFluidizer™. The concentration of the emulsion was 0.5 g PSEPVE/ml. Particle size analysis of PSEPVE emulsions prepared similarly, at 25° C. using a 200 mw Argon-ion laser at 488 nm with 90° scattering angle, showed the average diameter of PSEPVE emulsion droplets to be less than 0.5 micron.

Example 2
Preparation of 2-Stage PSEPVE/VF2 Copolymer: stage-1=36 m % PSEPVE; stage-2=0 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.07 hr. For stage-1 of the polymerization, a mixture of VF2 and PSEPVE (as PSEPVE emulsion containing 0.5 g PSPEVE/ml, as prepared in Example 1) in a 1:1 mole ratio was fed to the reactor at about the rate at which it was consumed maintaining about 2.07 MPa (300 psig) pressure in the reactor. The reaction was continued in this manner until about 215 g of PSEPVE were fed to the reactor to complete stage-1 of the polymerization. The feeding of PSEPVE was then discontinued to start stage-2 of the polymerization. For stage-2 of the polymerization, VF2 was fed to the reactor at about the rate at which it was consumed maintaining about 2.07 MPa (300 psig) pressure in the reactor, until an overall total of 334 g VF2 had been fed to the reactor. The total polymerization time for the combined stage-1 and stage-2 was about 4.7 hr. The overall reaction rate was 116 g/hr. The reactor contents were cooled to ambient temperature, vented to 0 kPa (0 psig) and discharged as a milky-white polymer emulsion containing 22 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 520 g of white granular polymer. DSC analysis showed a glass transition temperature at Tg=−24° C. at inflection and a well defined crystalline melting point at Tm=166° C. (ΔHf=22.2 J/g) on the second heat. Elemental analysis found: C, 30.41 wt % from which an average composition of 8.1 mole % PSEPVE and 91.9 mole % VF2 could be calculated. The polymer could be pressed into translucent white slabs and films at 200° C. that were clean and dense, free of voids or visible color. The fabricated polymer had the following tensile properties: initial modulus=176.4 MPa (25.6 Kpsi), tensile strength= 22.7 MPa (3.3 Kpsi), elongation at break=260%.

Example 2a
Preparation of the Lithium Sulfonate Form of PSEPVE/VF2 Copolymer and Measurement of Lithium Ion Conductivity 100 g of the 2-stage PSEPVE/VF2 copolymer powder prepared in Example 2 was combined under inert atmosphere with 750 ml methanol and 6.9 g lithium carbonate in a 3-liter 3-necked flask equipped with mechanical stirrer, addition funnel and distillation head. The slurry was allowed to stir at 25° C. for 22 hr at which time 200 ml toluene was added and the contents were heated to reflux. As toluene/methanol were distilled off from the reaction, pure toluene was added to the flask to make up volume loss. When the distillation head temperature reached 105° C., 10 g ethylene carbonate was added. An additional 300 ml distillate was collected, at which time the distillate was collected in fractions and analyzed. When the fraction of toluene in the distillate exceeded 99.5% the distillation was stopped and the reaction contents cooled to 25° C. The polymer was filtered under inert atmosphere and dried at ambient temperature under vacuum to yield 105.7 g of off-white granular polymer. F19 nmr of a polymer solution in perdeuterated dimethyl formamide showed a complete absence of sulfonyl fluoride.

The following operations and measurements were performed in a nitrogen purged Vacuum Atmospheres glove box. An ionomer gel was formed by mixing 1 part lithium sulfonate ionomer and 3 parts of an ethylene carbonate/propylene carbonate mixture (1:1 by weight) at 100° C. The ionomer gel was melt pressed at 120° C. to a thin film about 0.004 in. thick. A 1.0 by 1.5 cm2 section of this film was assembled into a four-point-probe conductivity cell. Lithium ion conductivity was measured at ambient conditions according to the method of Doyle et al, WO 98/20573, and determined to be equal to $6.19 \times 10^{-4}$ S/cm.

Example 2b

Preparation of the Sulfonic Acid Form of PSEPVE/VF2 Copolymer and Measurement of Proton Ion Conductivity A film, 0.005 in. to 0.007 in. thick, was prepared from the 2-stage PSEPVE/VF2 copolymer powder prepared in Example 2 by melt pressing at 200° C. The film was supported between Teflon™ mesh to prevent it from folding on itself and immersed for 24 hr in a 1-liter stirred bath containing a 0.4 molar ammonium carbonate solution in 1:1 methanol/water at 50° C. At the end of this period, the supported film assembly was removed from the ammonium carbonate solution, rinsed with several portions of demineralized water, then immersed for 18 hr in a second 1-liter stirred bath containing 3 molar nitric acid at 70° C. At the end of this period, the supported film assembly was removed from the nitric acid solution, rinsed with several portions of demineralized water, then immersed in boiling demineralized water for 2 hr. The water was changed several times during the boiling to remove residual nitric acid. At the end of this period, the supported film assembly was removed from the boiling demineralized water and immediately immersed in fresh demineralized water at ambient temperature. A 1.0 by 1.5 cm2 section of the film was blotted dry and assembled into a conductivity cell. Proton ion conductivity was measured at ambient conditions according to the method of Sone et al, *J. Electrochem. Soc* 143, 1254 (1996), and determined to be equal to $81 \times 10^{-3}$ S/cm.

Example 3

Preparation of PSEPVE/VF2 Copolymer: stage-1=25 m % PSEPVE; stage-2=0 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.06 hr. For stage-1 of the polymerization, a mixture of VF2 and PSEPVE (as PSEPVE emulsion containing 0.5 g PSEPVE/ml, as prepared in example 1) in a 2:1 mole ratio was fed to the reactor at about the rate at which it was consumed maintaining about 2.07 MPa (300 psig) pressure in the reactor. The reaction was continued in this manner until about 215 g of PSEPVE were fed to the reactor to complete stage-1 of the polymerization. The feeding of PSEPVE was then discontinued to start stage-2 of the polymerization. For stage-2 of the polymerization, VF2 was fed to the reactor at about the rate at which it was consumed maintaining about 2.07 MPa (300 psig) pressure in the reactor, until an overall total of 332 g VF2 had been fed to the reactor. The total polymerization time for the combined stage-1 and stage-2 was about 3.9 hr. The overall reaction rate was 141 g/hr. The reactor contents were cooled to ambient temperature, vented to 0 kPa (0 psig) and discharged as a milky-white polymer emulsion containing 22 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 524 g of white granular polymer. DSC analysis showed a glass transition temperature at Tg=−23° C. at inflection and a well defined crystalline melting point at Tm=165° C. (ΔHf=20.0 J/g) on the second heat. Elemental analysis found: C, 30.33 wt % from which an average composition of 8.2 mole % PSEPVE and 91.8 mole % VF2 could be calculated. The polymer could be pressed into translucent white slabs and films at 200° C. that were clean and dense, free of voids or visible color. The fabricated polymer had the following tensile properties: initial modulus=122.6 MPa (17.8 Kpsi), tensile strength= 19.3 MPa (2.8 Kpsi), elongation at break=270%.

In accord with the procedures of example 2a, a 100 g sample of copolymer powder was converted to the lithium sulfonate ionomer form using 6.5 g lithium carbonate. An ionomer gel was formed by mixing 1 part lithium sulfonate ionomer and 3 parts of an ethylene carbonate/propylene carbonate mixture (1:1 by weight) and melt pressed to a thin film. Ionic conductivity was measured at ambient conditions according to the method of Doyle et al, WO 98/20573, and determined to be equal to $7.1 \times 10^{-4}$ S/cm. In accord with the procedures of example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem. Soc* 143, 1254 (1996)., and determined to be equal to $95\times10^{-3}$ S/cm.

Example 4

Preparation of 2-Stage PSEPVE/VF2 Copolymer: stage-1= 20 m % PSEPVE; stage-2=0 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.04 hr. For stage-1 of the polymerization, a mixture of VF2 and PSEPVE (as PSEPVE emulsion containing 0.5 g PSPEVE/ml, as prepared in example 1) in a 3:1 mole ratio was fed to the reactor at about the rate at which it was consumed maintaining about 2.07 MPa (300 psig) pressure in the reactor. The reaction was continued in this manner until about 215 g of PSEPVE were fed to the reactor to complete stage-1 of the polymerization. The feeding of PSEPVE was then discontinued to start stage-2 of the polymerization. For stage-2 of the polymerization, VF2 was fed to the reactor at about the rate at which it was consumed maintaining about 2.07 MPa (300 psig) pressure in the reactor, until an overall total of 333 g VF2 had been fed to the reactor. The total polymerization time for the combined stage-1 and stage-2 was about 2.6 hr. The overall reaction rate was 212 g/hr. The reactor contents were cooled to ambient temperature, vented to 0 kPa (0 psig) and discharged as a milky-white polymer emulsion containing 23 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 559 g of white granular polymer. DSC analysis showed a glass transition temperature at Tg=−26° C. at inflection and a well defined crystalline melting point at Tm=162° C. ($\Delta$Hf=19.2 J/g) on the second heat. Elemental analysis found: C, 30.445 wt % from which an average composition of 8.0 mole % PSEPVE and 92.0 mole % VF2 could be calculated. The polymer could be pressed into translucent white slabs and films at 200° C. that were clean and dense, free of voids or visible color. A copolymer prepared similarly in accord with the above procedure had the following tensile properties: initial modulus=60.6 MPa (8.8 Kpsi), tensile strength=15.8 MPa (2.3 Kpsi), elongation at break=290%.

In accord with the procedures of Example 2a, an 100 g sample of copolymer powder was converted to the lithium sulfonate ionomer form using 6.5 g lithium carbonate. An ionomer gel was formed by mixing 1 part lithium sulfonate ionomer and 3 parts of an ethylene carbonate/propylene carbonate mixture (1:1 by weight) and melt pressed to a thin film. Ionic conductivity was measured at ambient conditions according to the method of Doyle et al, WO 98/20573, and determined to be equal to $7.4\times10^{-4}$ S/cm. In accord with the procedures of example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem. Soc* 143, 1254 (1996), and determined to be equal to $82\times10^{-3}$ S/cm.

Example 5

Preparation of 2-Stage PSEPVE/VF2 Copolymer: stage-1= 17 m % PSEPVE; stage-2=0 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.05 hr. For stage-1 of the polymerization, a mixture of VF2 and PSEPVE (as PSEPVE emulsion containing 0.5 g PSPEVE/ml, as prepared in Example 1) in a 4:1 mole ratio was fed to the reactor at about the rate at which it was consumed maintaining about 2.07 MPa (300 psig) pressure in the reactor. The reaction was continued in this manner until about 215 g of PSEPVE were fed to the reactor to complete stage-1 of the polymerization. The feeding of PSEPVE was then discontinued to start stage-2 of the polymerization. For stage-2 of the polymerization, VF2 was fed to the reactor at about the rate at which it was consumed maintaining about 2.07 MPa (300 psig) pressure in the reactor, until an overall total of 334 g VF2 had been fed to the reactor. The total polymerization time for the combined stage-1 and stage-2 was about 2.6 hr. The overall reaction rate was 210 g/hr. The reactor contents were cooled to ambient temperature, vented to 0 kPa (0 psig) and discharged as a milky-white polymer emulsion containing 22 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 551 g of white granular polymer. DSC analysis showed a glass transition temperature at Tg=−26° C. at inflection and a well defined crystalline melting point at Tm=160° C. (ΔHf=15.9 J/g) on the second heat. Elemental analysis found: C, 30.28 wt % from which an average composition of 8.3 mole % PSEPVE and 91.7 mole % VF2 could be calculated. The polymer could be pressed into translucent white slabs and films at 200° C. that were clean and dense, free of voids or visible color. The fabricated polymer had the following tensile properties: initial modulus=53.1 MPa (7.7 Kpsi), tensile strength=11.7 MPa (1.7 Kpsi), elongation at break=240%.

In accord with the procedures of Example 2a, an 100 g sample of copolymer powder was converted to the lithium sulfonate ionomer form using 6.6 g lithium carbonate. An ionomer gel was formed by mixing 1 part lithium sulfonate ionomer and 3 parts of an ethylene carbonate/propylene carbonate mixture (1:1 by weight) and melt pressed to a thin film. Ionic conductivity was measured at ambient conditions according to the method of Doyle et al, WO 98/20573, and determined to be equal to 7.0×10−4 S/cm. In accord with the procedures of example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 79×10−3 S/cm.

COMPARATIVE EXAMPLE A
Preparation of random PSEPVE/VF2 Copolymer of Similar Average Composition A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.75 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.04 hr. A mixture of VF2 and PSEPVE (as PSEPVE emulsion containing 0.5 g PSPEVE/ml, as prepared in example 1) in a 9:1 mole ratio was fed to the reactor at about the rate at which it was consumed maintaining about 2.07 MPa (300 psig) pressure in the reactor. The reaction was continued in this manner until about 402 g of VF2 and PSEPVE were fed to the reactor to complete the polymerization. The total polymerization time was about 1.3 hr. The overall reaction rate was 304 g/hr. The reactor contents were cooled to ambient temperature, vented to 0 kPa (0 psig) and discharged as a milky-white polymer emulsion containing 17.6 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 422 g of white granular polymer. DSC analysis showed a glass transition temperature at Tg=−24° C. at inflection and a broad crystalline melting point at Tm=106° C. (ΔHf=9.7 J/g) on the second heat. Elemental analysis found: C, 29.94 wt % from which an average composition of 8.9 mole % PSEPVE and 91.1 mole % VF2 could be calculated.

In accord with the procedures of example 2a, an 100 g sample of copolymer powder was converted to the lithium sulfonate ionomer form using 6.8 g lithium carbonate. An ionomer gel was formed by mixing 1 part lithium sulfonate ionomer and 3 parts of an ethylene carbonate/propylene carbonate mixture (1:1 by weight) and melt pressed to a thin film. Ionic conductivity was measured at ambient conditions according to the method of Doyle et al, WO 98/20573, and determined to be equal to 4.5×10−4 S/cm. In accord with the procedures of example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 120×10−3 S/cm.

This example demonstrates that the copolymers of the present invention, prepared by a 2-stage polymerization process in which the mole ratio of VF2 to PSEPVE fed during stage-1 is substantially different from the mole ratio of VF2 to PSEPVE fed during stage-2, are distinct from a random copolymer of similar average composition, prepared by feeding a mixture of VF2 and PSEPVE (as PSEPVE emulsion) at a single constant mole ratio throughout the reaction, in that the copolymers of the present invention exhibit substantially higher melting endotherms.

COMPARATIVE EXAMPLE B
Preparation of PSEPVE/VF2 Copolymer of Similar Average Composition in Which All The PSEPVE is Precharged at The Start of The Polymerization A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.75 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 300 ml PSEPVE emulsion (containing 150 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.03 hr. VF2 monomer was fed to the reactor at about the rate at which it was consumed maintaining about 2.07 MPa (300 psig) pressure in the reactor. The reaction was continued in this manner until about 208 g of VF2 were fed to the reactor over a total time of about 1.1 hr. The overall reaction rate was 189 g/hr. The reactor contents were cooled to ambient temperature, vented to 0 kPa (0 psig) and discharged as a milky-white polymer emulsion containing 16 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 355 g of white granular polymer. DSC analysis showed a glass transition temperature at Tg=−21° C. at inflection and a well defined crystalline melting point at Tm=163° C. (ΔHf=25.0 J/g) on the second heat. Elemental analysis found: C, 30.295 wt % from which an average composition of 8.3 mole % PSEPVE and 91.7 mole % VF2 could be calculated. The polymer could be pressed into translucent white slabs and films at 200° C. that were clean and dense, free of voids or visible color. The fabricated polymer had the following tensile properties: initial modulus=157.8 MPa (22.9 Kpsi), tensile strength=17.2 MPa (2.5 Kpsi), elongation at break=172%.

This example demonstrates that the copolymers of the present invention, prepared by a 2-stage polymerization process in which a mixture of VF2 and PSEPVE (as PSEPVE emulsion) are fed during the polymerization and the mole ratio of VF2 to PSEPVE fed during stage-1 is substantially different from the mole ratio of VF2 to PSEPVE fed during stage-2, are distinct from a copolymer of similar average composition prepared by precharging all the PSEPVE and feeding only VF2 during the polymerization, in that the copolymers of the present invention exhibit a lower heat of fusion (ΔHf≦22.2 J/g) upon melting.

Comparative Example C
Compositions Prepared by Blends of Discrete Stage-1 and Stage-2 Polymers A separate emulsion containing 8.8 wt % of amorphous stage-1 VF2/PSEPVE copolymer (A), containing 30 mole % PSEPVE and 70 mole % VF2 (Tg=−22.5° C.), was prepared in accord with the methods of Example 2, wherein the polymerization was terminated at the end of stage-1 after 254 g of a mixture of VF2 and PSEPVE (as PSEPVE emulsion containing 0.5 g PSPEVE/ml, as prepared in Example 1) in a 1:1 mole ratio were fed to the reaction over 0.6 hr. The reactor contents were cooled to ambient temperature, vented to 0 kPa (0 psig) and discharged as a clear polymer emulsion.

A separate emulsion containing 10.2 wt % of crystalline stage-2 VF2 homopolymer (B), (Tm=170.5° C., ΔHf=46 J/g), was prepared in accord with the methods of Example 2 as follows: A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water. The reactor was charged with 2.0 liter demineralized water and 19 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. The reactor contents were agitated at 200 rpm and heated to 60° C. and pressurized with VF2 to 2.07 MPa (300 psig) at which time 0.9 g potassium persulfate dissolved in 20 ml demineralized water was injected at 10 ml/min. The polymerization initiated in 0.18 hr. VF2 monomer (221.7 g) was fed to the reactor at about the rate at which it was consumed maintaining about 2.07 MPa (300 psig) pressure in the reactor over a total time of about 1.3 hr. The reactor contents were cooled to ambient temperature, vented to 0 kPa (0 psig) and discharged as a milky-white polymer emulsion.

Emulsion (A) containing 72 g of amorphous stage-1 VF2/PSEPVE copolymer was mixed with emulsion (B) containing 78 g crystalline stage-2 VF2 homopolymer. The resulting blend of emulsions (A) and (B) was frozen to cause agglomeration of the polymer particles and their separation from the aqueous phase. The polymer particles agglomerated into a single spongy mass which was then chopped to reduce the polymer mass to granular form. The chopped agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 148 g of white granular polymer. DSC analysis showed a glass transition temperature at Tg=−21° C. at inflection and a well defined crystalline melting point at Tm=169° C. (ΔHf=28.5 J/g) on the second heat. Elemental analysis found: C, 30.66 wt % from which an average composition of 7.6 mole % PSEPVE and 92.4 mole % VF2 could be calculated. The polymer could be pressed into translucent white slabs and films at 200° C. that were dense. The fabricated polymer had the following tensile properties: initial modulus=266 MPa (38.6 Kpsi), tensile strength=16.5 MPa (2.4 Kpsi), elongation at break=80%.

This example demonstrates that the copolymers of the present invention, prepared by a 2-stage polymerization process in which a mixture of VF2 and PSEPVE (as PSEPVE emulsion) are fed during the polymerization and the mole ratio of VF2 to PSEPVE fed during stage-1 is substantially different from the mole ratio of VF2 to PSEPVE fed during stage-2, are distinct from a simple blend of similar average composition derived from blending of the discrete stage-1 and stage-2 components, in that the copolymers of the present invention exhibit substantially superior tensile elongation at break properties.

Example 6
Preparation of 2-Stage PSEPVE/VF2 Copolymer: stage-1=36 m % PSEPVE; stage-2=3 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.06 hr. For stage-1 of the polymerization, a mixture of VF2 and PSEPVE (as PSEPVE emulsion containing 0.5 g PSPEVE/ml, as prepared in Example 1) in a 1:1 mole ratio was fed to the reactor at about the rate at which it was consumed maintaining about 2.07 MPa (300 psig) pressure in the reactor. The reaction was continued in this manner until about 160 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 97:3 mole ratio was fed to the reactor at about the rate at which it was consumed maintaining about 2.07 MPa (300 psig) pressure in the reactor. The reaction was continued in this manner until about an additional 55 g of PSEPVE were fed to the reactor to complete stage-2 of the polymerization. The overall reaction rate was about 248 g/hr. The reactor contents were cooled to ambient temperature, vented to 0 kPa (0 psig) and discharged as a milky-white polymer emulsion containing about 21 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 505 g of white granular polymer. DSC analysis showed a glass transition temperature at Tg=−23.5° C. at inflection and a well defined crystalline melting point at Tm=146.5° C. (ΔHf=16.0 J/g) on the second heat. F19nmr analysis of a polymer solution in perdeuterated dimethyl formamide was consistent with an average composition of the copolymer of 9.7 mole % PSEPVE and 90.3 mole % VF2. The polymer could be pressed into translucent white slabs and films at 200° C. that were clean and dense, free of voids or visible color. The fabricated polymer had the following tensile properties: initial modulus=75.8 MPa (11.0 Kpsi), tensile strength=15.8 MPa (2.3 Kpsi), elongation at break=302%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem. Soc* 143, 1254 (1996), and determined to be equal to 59×10−3 S/cm.

Example 6a
Preparation of the PSVF2-Methide Ionomer Form of 2-Stage PSEPVE/VF2 Copolymer: stage-1=36 m % PSEPVE; stage-2=3 m % PSEPVE A 5 L, 4-neck flask was fitted with a mechanical stirrer incorporating additional PTFE wall-wiping blades, nitrogen inlet adapter, addition funnel, and thermocouple well. The flask was charged with lithium hydride (2.87 g, 360 mequiv.) and 200 g (175 mequiv.) of a 2-stage PSEPVE/VF2 copolymer powder prepared in accord with the procedures of Example 6 and containing 8.4 mole % PSEPVE. Anhydrous, pre-chilled (5° C.) THF (1400 mL) was added by cannula. The mixture was cooled to ca. 2° C., and stirred while distilled malononitrile (12.01 g, 182 mequiv.) in THF (100 mL was added dropwise over a 50 min period. Temperature was controlled at 2–5° C. during addition. Another 50 mL portion of THF was used to rinse addition funnel for complete transfer of malononitrile. The mixture was maintained at 3°–4° C. for an hour after malononitrile addition was complete. Reaction mixture temperature was increased gradually over an hour to 15° C., and was maintained at this temperature for 1.0 hr. Stirring rate was occasionally adjusted to avoid aggregation of residual LiH particles in locations inaccessible to bulk reaction mixture. The temperature was then increased gradually to 20° C. and maintained at this value for 20 hr.

The mixture was cooled to ca. 5° C., treated with water (dropwise at first), adding distilled water to make up total aqueous volume of 3000 mL over ca. 1 hour. When water addition was complete, pH was reduced to 7.1 by addition of dilute acetic acid. THF was distilled at atmospheric pressure using a slow nitrogen sweep to facilitate removal. Process was terminated when distillate temperature was 75° C. The mixture was cooled to room temperature. The mixture was transferred to a plastic jug and frozen solid, then allowed to thaw. Filtration using fine weave Dacron was straightforward. The first ca. 3 L of filtrate was saved separately for analysis. Filtered polymer was washed until filtrate was colorless and foam was minimal. Product was transferred to a pan for freeze-drying. There was obtained 170 g of material after breaking up the resulting slab in a Waring blender and sizing (coarse #20 sieve tray).

19F NMR (DMF-d7) of major portion of the product: +45.9 (s, a=0.0505, —SO2F), −76.5 to −80.0 (m, CF3 and OCF2, a=7.00), −90 to −95. (m, with major signals at −91.5, −91.96, −94.7, (CH2CF2, a=21.841), −108 to −117.5 (m, with major signals at −113.5 and −115.9, −116.2 for CF2S, a=5.912; minor signal centered at −111.0 corresponds to starting sulfonyl fluoride copolymer; minor signal at −117 to —SO3Li form; estimated ca. 95% conversion of SO2F), −121 to −127 (m, a=1.799), −144 (m, CF, a=1.118), consistent with 7.5 mole % comonomer content.

Thermal analyses involved an isothermal in situ drying step (2 hr at 120° C. under flow of N2) before beginning to collect data. A 1° C./min cooling program was implemented to obtain reproducible, reversible melting phenomena (DSC). TGA: Pre-dry, isothermal weight loss at 120° C. showed 1.7% water content. Onset of polymer weight loss observed at 245° C. DSC: 2nd heat showed Tm at 141° C. (ΔHf=11.7 J/g); 3rd heat similar to 2nd. Tg ca. −39° C.

Example 7
Preparation of 2-Stage PSEPVE/VF2 Copolymer: stage-1= 36 m % PSEPVE; stage-2=5 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.07 hr. For stage-1 of the polymerization, a mixture of VF2 and PSEPVE (as PSEPVE emulsion containing 0.5 g PSPEVE/ml, as prepared in Example 1) in a 1:1 mole ratio was fed to the reactor at about the rate at which it was consumed maintaining about 2.07 MPa (300 psig) pressure in the reactor. The reaction was continued in this manner until about 119.5 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 95:5 mole ratio was fed to the reactor at about the rate at which it was consumed maintaining about 2.07 MPa (300 psig) pressure in the reactor. The reaction was continued in this manner until about an additional 95.5 g of PSEPVE were fed to the reactor to complete stage-2 of the polymerization. The overall reaction rate was about 185 g/hr. The reactor contents were cooled to ambient temperature, vented to 0 kPa (0 psig) and discharged as a milky-white polymer emulsion containing about 20 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 488 g of white granular polymer. DSC analysis showed a glass transition temperature at Tg=−24° C. at inflection and a well defined crystalline melting point at Tm=137.8° C. ($\Delta$Hf=14.8 J/g) on the second heat. F19nmr analysis of a polymer solution in perdeuterated dimethyl formamide was consistent with an average composition of the copolymer of 9.2 mole % PSEPVE and 90.8 mole % VF2. The polymer could be pressed into translucent white slabs and films at 200° C. that were clean and dense, free of voids or visible color. The fabricated polymer had the following tensile properties: initial modulus=83.4 MPa (12.1 Kpsi), tensile strength=15.8 MPa (2.3 Kpsi), elongation at break=363%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 55×10−3 S/cm.

Example 8
Preparation of 2-Stage PSEPVE/VF2 Copolymer: stage-1= 36 m % PSEPVE; stage-2=7 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.03 hr. For stage-1 of the polymerization, a mixture of VF2 and PSEPVE (as PSEPVE emulsion containing 0.5 g PSPEVE/ml, as prepared in Example 1) in a 1:1 mole ratio was fed to the reactor at about the rate at which it was consumed maintaining about 2.07 MPa (300 psig) pressure in the reactor. The reaction was continued in this manner until about 75 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 93:7 mole ratio was fed to the reactor at about the rate at which it was consumed maintaining about 2.07 MPa (300 psig) pressure in the reactor. The reaction was continued in this manner until about an additional 140 g of PSEPVE were fed to the reactor to complete stage-2 of the polymerization. The overall reaction rate was about 404 g/hr. The reactor contents were cooled to ambient temperature, vented to 0 kPa (0 psig) and discharged as a milky-white polymer emulsion containing about 21 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 501 g of white granular polymer. DSC analysis showed a glass transition temperature at Tg=−25° C. at inflection and a well defined crystalline melting point at Tm=121.3° C. ($\Delta$Hf=14.4 J/g) on the second heat. F19nmr analysis of a polymer solution in perdeuterated dimethyl formamide was consistent with an average composition of the copolymer of 9.4 mole % PSEPVE and 90.6 mole % VF2. The polymer could be pressed into translucent white slabs and films at 200° C. that were clean and dense, free of voids or visible color. The fabricated polymer had the following tensile properties: initial modulus=60.6 MPa (8.8 Kpsi), tensile strength=14.5 MPa (2.1 Kpsi), elongation at break=334%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996)., and determined to be equal to 62×10−3 S/cm.

Example 9
Preparation of 2-Stage PSEPVE/VF2 Copolymer: stage-1= 20 m % PSEPVE; stage-2=1 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.09 hr. For stage-1 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about 201.5 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 99:1 mole ratio was fed to the reactor at about the rate at which it was consumed maintaining about 2.07 MPa (300 psig) pressure in the reactor. The reaction was continued in this manner until about an additional 13.5 g of PSEPVE were fed to the reactor to complete stage-2 of the polymerization. The overall reaction rate was about 194 g/hr. The reactor contents were cooled to ambient temperature, vented to 0 kPa (0 psig) and discharged as a milky-white polymer emulsion containing about 21 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 482 g of white granular polymer. DSC analysis showed a glass transition temperature at Tg=−26.6° C. at inflection and a well defined crystalline melting point at Tm=155.5° C. (ΔHf=13.9 J/g) on the second heat. F19nmr analysis of a polymer solution in perdeuterated dimethyl formamide was consistent with an average composition of the copolymer of 9.4 mole % PSEPVE and 90.6 mole % VF2. The polymer could be pressed into translucent white slabs and films at 200° C. that were clean and dense, free of voids or visible color. The fabricated polymer had the following tensile properties: initial modulus=42.7 MPa (6.2 Kpsi), tensile strength=13.8 MPa (2.0 Kpsi), elongation at break=312%.

Example 9a

Preparation of the PSVF2-Methide Ionomer Form of 2-Stage PSEPVE/VF2 Copolymer: stage-1=20 m % PSEPVE; stage-2=1 m % PSEPVE A 12 L, 4-neck jacketed cylindrical vessel was fitted with a 4-blade mechanical stirrer and helical impellers located at the vessel bottom and at the gas/medium interface (when fully charged), nitrogen inlet adapter, addition funnel, and thermocouple well. The vessel was charged with lithium hydride (6.16 g, 776 mequiv.) and 400 g (377 mequiv.) of the 2-stage PSEPVE/VF2 copolymer powder prepared in Example 9. Anhydrous, pre-chilled (5° C.) THF (2800 mL) was added by cannula. The mixture was cooled to ca. 2° C., and stirred while distilled malononitrile (25.8 g, 392 mequiv.) in THF (200 mL was added dropwise over a 1 hr period. Temperature was controlled at 2°–5° C. during addition. Another 100 mL portion of THF was used to rinse addition funnel for complete transfer of malononitrile. The mixture was maintained at 3°–4° C. for an hour after malononitrile addition was complete. Reaction mixture temperature was increased gradually over an hour to 15° C., and was maintained at this temperature for 1.0 hr. The temperature was then increased gradually to 20° C. and maintained at this value for 20 hr.

The mixture was cooled to ca. 5° C., treated with chilled distilled water (dropwise at first), adding distilled water to make up total aqueous volume of 5 L over ca. 1–2 hour. When water addition was complete, pH was adjusted to 7.1 by addition of dilute acetic acid. THF was distilled at reduced pressure. The mixture was transferred to a plastic jug and frozen solid, then allowed to thaw. Product was collected by filtration using fine weave Dacron cloth. Polymer was washed with water to remove solvent and impurity residues, and washing was continued until filtrate was colorless and foam was minimal. Product was transferred to pans for freeze-drying. The resulting foam slab was chopped in a Waring blender to give fluff which was sized (coarse #20 sieve tray) and finally dried using a tumble dryer, operating with a temperature ramp to 100° C. at 5–7 mm Hg with supplementary nitrogen feed (18 hr) to give 364 g product.

19F NMR (DMF-d7): +45.9 (s, a=0.0348), −76.5 to −80.0 (m, CF3 and OCF2, a=7.00), −90 to −95.0 (m, with major signals at −91.5, −91.9, −94.7, (CH2CF2, a=15.827), −108 to −1117.5 (m, with major signals at −113.5 and −115.9, −116.2 for CF2S, a=4.991; signal centered at −111.0 corresponds to starting sulfonyl fluoride copolymer; minor signal at −117 to —SO3Li form; estimated >97% conversion of SO2F, substantially better than p. 89), −121 to −127 (m, a=1.754), −144 (m, CF, a=1.106), consistent with 10.2 mole % comonomer content.

Thermal analyses involved an iso-thermal in situ drying step (2 hr at 120° C. under flow of N2) before beginning to collect data. Where applicable, 1° C./min cooling program was implemented to obtain reproducible, reversible melting phenomena upon re-heat. TGA: Pre-dry, isothermal weight loss at 120° C. showed 1% water content. Onset of polymer weight loss observed at 250° C. DSC: 2nd heat showed Tm at 150° C. (ΔHf=9 J/g); 3rd heat similar to 2nd. Tg ca. −41° C.

The following operations and measurements were performed in a nitrogen-purged Vacuum Atmospheres glove box. An ionomer gel was formed by mixing 1 part of the product, PSVF2-methide ionomer form of the 2-stage PSEPVE/VF2 copolymer, and 3 parts of an ethylene carbonate/propylene carbonate mixture (1:1 by weight) in a vial, followed by thorough hand-mixing with a spatula. The resulting composition was melt-formed into a film using a pre-heat zone (135° C.) coupled with a set of calendar rollers maintained at 125° C. The resulting films were clear and free of bubbles. A 1.0 cm by 1.5 cm section of the film was assembled into a four-point probe conductivity cell. Lithium ion conductivity was measured at ambient conditions according to the method of Doyle et al., WO 98/20573, and determined to be 5.7×10−4 S/cm.

Example 10

Preparation of 2-Stage PSEPVE/VF2 Copolymer: stage-1= 20 m % PSEPVE; stage-2=3 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.05 hr. For stage-1 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about 171 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 97:3 mole ratio was fed to the reactor at about the rate at which it was consumed maintaining about 2.07 MPa (300 psig) pressure in the reactor. The reaction was continued in this manner until about an additional 44 g of PSEPVE were fed to the reactor to complete stage-2 of the polymerization. The overall reaction rate was about 324 g/hr. The reactor contents were cooled to ambient temperature, vented to 0 kPa (0 psig) and discharged as a milky-white polymer emulsion containing about 21 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 510 g of white granular polymer. DSC analysis showed a glass transition temperature at Tg=−26.4° C. at inflection and a well defined crystalline melting point at Tm=144.9° C. (ΔHf=14.0 J/g) on the second heat. F19nmr analysis of a polymer solution in perdeuterated dimethyl formamide was consistent with an average composition of the copolymer of 9.8 mole % PSEPVE and 90.2 mole % VF2. The polymer could be pressed into translucent white slabs and films at 200° C. that were clean and dense, free of voids or visible color. The fabricated polymer had the following tensile properties: initial modulus=44.1 MPa (6.4 Kpsi), tensile strength=13.8 MPa (2.0 Kpsi), elongation at break=319%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 53×10−3 S/cm.

Example 10a
Preparation of the PSVF2-Methide Ionomer Form of 2-Stage PSEPVE/VF2 Copolymer: stage-1=20 m % PSEPVE; stage-2=3 m % PSEPVE A 5 L, 4-neck flask was fitted with a mechanical stirrer incorporating additional PTFE wall-wiping blades, nitrogen inlet adapter, addition funnel, and thermocouple well. The flask was charged with lithium hydride (3.11 g, 391 mequiv.) and 200 g (189.7 mequiv.) of a 2-stage PSEPVE/VF2 copolymer powder prepared in accord with the procedures of Example 10 and containing 9.5 mole % PSEPVE. Anhydrous, pre-chilled (5° C.) THF (1400 mL) was added by cannula. The mixture was cooled to ca. 2° C., and stirred while distilled malononitrile (13.0 g, 197 mequiv.) in THF (100 mL was added dropwise over a 50 min period. Temperature was controlled at 2°–5° C. during addition. Another 50 mL portion of THF was used to rinse addition funnel for complete transfer of malononitrile. The mixture was maintained at 3°–4° C. for an hour after malononitrile addition was complete. Reaction mixture temperature was increased gradually over an hour to 15° C., and was maintained at this temperature for 1.0 hr. The temperature was then increased gradually to 20° C. and maintained at this value for 20 hr.

The mixture was cooled to ca. 5° C., treated with chilled distilled water (dropwise at first; heat of mixing requires cooling to maintain temperature in desired range), adding distilled water to make up total aqueous volume of 3000 mL over ca. 1–2 hour. When water addition was complete, pH was adjusted to 7.1 by addition of dilute acetic acid. THF was distilled at atmospheric pressure using a slow nitrogen sweep to facilitate removal. The mixture was cooled to room temperature, transferred to a plastic jug and frozen solid, then allowed to thaw. Product was collected by filtration using fine weave Dacron. Polymer was washed with water to remove THF residue, and washing was continued until filtrate was colorless and foam was minimal. Product was transferred to pans for freeze-drying. The resulting foam slab (193.2 g) was chopped in a Waring blender to give fluff which was further dried using a tumble dryer, operating with a temperature ramp up to 90° C. at 5–7 mm Hg with supplementary nitrogen feed. Drying process was stopped and material was again chopped and sized (coarse #20 sieve tray). Final drying at 100° C./5 mm Hg with N2 make-up (18 hr) gave 171.4 g.

19F NMR (DMF-d7): +45.9 (minor s, a=0.024), −76.5 to −80.0 (m, CF3 and OCF2, a=7.00), −90 to −95.0 (m, with major signals at −91.5, −91.96, −94.7, (CH2CF2, a=15.821), −108 to −117.5 (m, with major signals at −113.5 and −115.9, −116.2 for CF2S, a=5.784; trace signal centered at −111.0 corresponds to starting sulfonyl fluoride copolymer; minor signal at −117 to —SO3Li form; estimated 98% conversion of SO2F), −121 to −128 (m, a=1.333), −144 (m, CF, a=1.255), consistent with 10.3 mole % comonomer content.

Thermal analyses involved an iso-thermal in situ drying step (2 hr at 120° C. under flow of N2) before beginning to collect data. Where applicable, 1° C./min cooling program was implemented to obtain reproducible, reversible melting phenomena upon re-heat. TGA: Pre-dry, isothermal weight loss at 120° C. showed 1% water content. Onset of polymer weight loss observed at 250° C. DSC: 1st heat showed Tm at 144° C. (ΔHf=12.4 J/g); 2nd heat showed Tm at 138° C. (ΔHf=7.2 J/g); 3rd heat similar to 2nd. Tg ca. −38° C. (0.01 W/g).

The following operations and measurements were performed in a nitrogen-purged Vacuum Atmospheres glove box. An ionomer gel was formed by mixing 1 part of the product, PSVF2-methide ionomer form of the 2-stage PSEPVE/VF2 copolymer, and 3 parts of an ethylene carbonate/propylene carbonate mixture (1:1 by weight) in a vial, followed by thorough hand-mixing with a spatula. The resulting composition was melt-formed into a film using a pre-heat zone (135° C.) coupled with a set of calendar rollers maintained at 125° C. The resulting films were clear and free of bubbles. A 1.0 cm by 1.5 cm section of the film was assembled into a four-point probe conductivity cell. Lithium ion conductivity was measured at ambient conditions according to the method of Doyle et al., WO 98/20573, and determined to be 9.1×10−4 S/cm.

Example 11
Preparation of 2-Stage PSEPVE/VF2 Copolymer: stage-1= 20 m % PSEPVE; stage-2=5 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.06 hr. For stage-1 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about 134.5 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 95:5 mole ratio was fed to the reactor at about the rate at which it was consumed maintaining about 2.07 MPa (300 psig) pressure in the reactor. The reaction was continued in this manner until about an additional 80.5 g of PSEPVE were fed to the reactor to complete stage-2 of the polymerization. The overall reaction rate was about 171 g/hr. The reactor contents were cooled to ambient temperature, vented to 0 kPa (0 psig) and discharged as a milky-white polymer emulsion containing about 19 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 474 g of white granular polymer. DSC analysis showed a glass transition temperature at Tg=−27.6° C. at inflection and a well defined crystalline melting point at Tm=138.2° C. (ΔHf=11.0 J/g) on the second heat. F19nmr analysis of a polymer solution in perdeuterated dimethyl formamide was consistent with an average composition of the copolymer of 9.6 mole % PSEPVE and 90.4 mole % VF2. The polymer could be pressed into translucent white slabs and films at 200° C. that were clean and dense, free of voids or visible color. The fabricated polymer had the following tensile properties: initial modulus=43.1 MPa (6.3 Kpsi), tensile strength=13.1 MPa (1.9 Kpsi), elongation at break=394%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 54×10−3 S/cm.

Example 11a
Preparation of the PSVF2-Methide Ionomer Form of 2-Stage PSEPVE/VF2 Copolymer: stage-1=20 m % PSEPVE; stage-2=5 m % PSEPVE A 5 L, 4-neck flask was fitted with a mechanical stirrer incorporating additional PTFE wall-wiping blades, nitrogen inlet adapter, addition funnel, and thermocouple well. The flask was charged with lithium hydride (3.04 g, 382 mequiv.) and 200 g (186 mequiv.) of a 2-stage PSEPVE/VF2 copolymer powder prepared in accord with the procedures of Example 11 and containing 9.2 mole % PSEPVE. Anhydrous, pre-chilled (5° C.) THF (1400 mL) was added by cannula. The mixture was cooled to ca. 2° C., and stirred while distilled malononitrile (12.74 g, 193 mequiv.) in THF (100 mL was added dropwise over a 50 min period. Temperature was controlled at 2°–5° C. during addition. Another 50 mL portion of THF was used to rinse addition funnel for complete transfer of malononitrile. The mixture was maintained at 3°–4° C. for an hour after malononitrile addition was complete. Reaction mixture temperature was increased gradually over an hour to 15° C., and was maintained at this temperature for 1.0 hr. The temperature was then increased gradually to 20° C. and maintained at this value for 20 hr.

The mixture was cooled to ca. 5° C., treated with chilled distilled water (dropwise at first), to make up total aqueous volume of 3 L over ca. 1–2 hour. When water addition was complete, pH was adjusted to 7.1 by addition of dilute acetic acid. THF was distilled at atmospheric pressure using a slow nitrogen sweep to facilitate removal. The mixture was cooled to room temperature, transferred to a plastic jug and frozen solid, then allowed to thaw. Product was collected by filtration using fine weave Dacron cloth. Polymer was washed with water to remove THF and impurity residues, and washing was continued until filtrate was colorless and foam was minimal. Product was transferred to jars for freeze-drying. The resulting foam was chopped in a Waring blender and sized (coarse #20 sieve tray) to give fluff which was further dried using a tumble dryer, operating with a temperature ramp up to 100° C. at 5–7 mm Hg with supplementary nitrogen feed. There was obtained 177 g of pink solid.

19F NMR (DMF-d7): +45.9 (trace, a=0.011), −76.5 to −80.0 (m, CF3 and OCF2, a=7.00), −90 to −95.0 (m, with major signals at −91.5, −91.95, −94.7, (CH2CF2, a=15.588), −108 to −117.5 (m, with major signals at −113.5 and −115.9, −116.2 for CF2S, a=4.900; trace signal centered at −111.0 corresponds to starting sulfonyl fluoride copolymer; minor signal at −117 to —SO3Li form; estimated 99% conversion of SO2F), −121 to −127 (m, a=1.492), −144 (m, CF, a=1.119), consistent with 10.5 mole % comonomer content.

Thermal analyses involved an iso-thermal in situ drying step (2 hr at 120° C. under flow of N2) before beginning to collect data. Where applicable, 1° C./min cooling program was implemented to obtain reproducible, reversible melting phenomena upon re-heat. TGA: Pre-dry, isothermal weight loss at 120° C. showed 3.4% water content. Onset of polymer weight loss observed at 250° C. DSC: 2nd heat showed Tm at 133° C. (ΔHf=5.3 J/g); 3rd heat similar to 2nd. Tg ca. −36° C.

The following operations and measurements were performed in a nitrogen-purged Vacuum Atmospheres glove box. An ionomer gel was formed by mixing 1 part of the product, PSVF2-methide ionomer form of the 2-stage PSEPVE/VF2 copolymer, and 3 parts of an ethylene carbonate/propylene carbonate mixture (1:1 by weight) in a vial, followed by thorough hand-mixing with a spatula. The resulting composition was melt-formed into a film using a pre-heat zone (135° C.) coupled with a set of calendar rollers maintained at 125° C. The resulting films were clear and free of bubbles. A 1.0 cm by 1.5 cm section of the film was assembled into a four-point probe conductivity cell. Lithium ion conductivity was measured at ambient conditions according to the method of Doyle et al., WO 98/20573, and determined to be 10.1×10−4 S/cm.

Example 12

Preparation of 2-Stage PSEPVE/VF2 Copolymer: stage-1=20 m % PSEPVE; stage-2=7 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.08 hr. For stage-1 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about 89.5 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 93:7 mole ratio was fed to the reactor at about the rate at which it was consumed maintaining about 2.07 MPa (300 psig) pressure in the reactor. The reaction was continued in this manner until about an additional 125.5 g of PSEPVE were fed to the reactor to complete stage-2 of the polymerization. The overall reaction rate was about 165 g/hr. The reactor contents were cooled to ambient temperature, vented to 0 kPa (0 psig) and discharged as a milky-white polymer emulsion containing about 20 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 476 g of white granular polymer. DSC analysis showed a glass transition temperature at Tg=−26.6° C. at inflection and a well defined crystalline melting point at Tm=125.3° C. (ΔHf=10.9 J/g) on the second heat. F19nmr analysis of a polymer solution in perdeuterated dimethyl formamide was consistent with an average composition of the copolymer of 9.4 mole % PSEPVE and 90.6 mole % VF2. The polymer could be pressed into translucent white slabs and films at 200° C. that were clean and dense, free of voids or visible color. The fabricated polymer had the following tensile properties: initial modulus=42.7 MPa (6.2 Kpsi), tensile strength=14.5 MPa (2.1 Kpsi), elongation at break=436%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 54×10−3 S/cm.

Example 13

Preparation of 2-Stage PSEPVE/VF2 Copolymer: stage-1=3 m % PSEPVE; stage-2=20 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.04 hr. For stage-1 of the polymerization, a mixture of VF2 and PSEPVE (as PSEPVE emulsion containing 0.5 g PSPEVE/ml, as prepared in Example 1) in a 97:3 mole ratio was fed to the reactor at about the rate at which it was consumed maintaining about 2.07 MPa (300 psig) pressure in the reactor. The reaction was continued in this manner until about 44 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about an additional 171 g of PSEPVE were fed to the reactor to complete stage-2 of the polymerization. The overall reaction rate was about 104 g/hr. The reactor contents were cooled to ambient temperature, vented to 0 kPa (0 psig) and discharged as a milky-white polymer emulsion containing about 18 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 412 g of spongy white polymer. DSC analysis showed a glass transition temperature at Tg=−26° C. at inflection and a well defined crystalline melting point at Tm=158.2° C. (ΔHf=9.7 J/g) on the second heat. F19nmr analysis of a polymer solution in perdeuterated dimethyl formamide was consistent with an average composition of the copolymer of 8.6 mole % PSEPVE and 91.4 mole % VF2. The polymer could be pressed into translucent white slabs and films at 200° C. that were clean and dense, free of voids or visible color. The fabricated polymer had the following tensile properties: initial modulus=71.7 MPa (10.4 Kpsi), tensile strength=11.7 MPa (1.7 Kpsi), elongation at break=276%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143,1254 (1996), and determined to be equal to 48×10−3 S/cm.

Example 14
Preparation of 2-Stage PSEPVE/VF2 Copolymer: stage-1=5 m % PSEPVE; stage-2=20 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.05 hr. For stage-1 of the polymerization, a mixture of VF2 and PSEPVE (as PSEPVE emulsion containing 0.5 g PSPEVE/ml, as prepared in Example 1) in a 95:5 mole ratio was fed to the reactor at about the rate at which it was consumed maintaining about 2.07 MPa (300 psig) pressure in the reactor. The reaction was continued in this manner until about 80.5 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about an additional 134.5 g of PSEPVE were fed to the reactor to complete stage-2 of the polymerization. The overall reaction rate was about 145 g/hr. The reactor contents were cooled to ambient temperature, vented to 0 kPa (0 psig) and discharged as a milky-white polymer emulsion containing about 20 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 475 g of fluffy white polymer. DSC analysis showed a glass transition temperature at Tg=−26° C. at inflection and a well defined crystalline melting point at Tm=143.4° C. (ΔHf=12.5 J/g) on the second heat. F19nmr analysis of a polymer solution in perdeuterated dimethyl formamide was consistent with an average composition of the copolymer of 8.9 mole % PSEPVE and 91.1 mole % VF2. The polymer could be pressed into translucent white slabs and films at 200° C. that were clean and dense, free of voids or visible color. The fabricated polymer had the following tensile properties: initial modulus=56.5 MPa (8.2 Kpsi), tensile strength=15.2 MPa (2.2 Kpsi), elongation at break=380%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 55×10−3 S/cm.

Example 15
Preparation of 2-Stage PSEPVE/VF2 Copolymer: stage-1=7 m % PSEPVE: stage-2=20 m % PSEPVE A 4-L horizontal, stainless-steel stirred polymerization reactor equipped with 4-bladed agitator, was flushed with nitrogen and conditioned by charging with 2 liters demineralized water, 5 g ammonium persulfate, 5 g ammonium perfluorooctanoate, then agitating at 200 rpm while heating the vessel contents to 100° C. for 15 min. The vessel was cooled, the contents dumped to waste and the vessel rinsed 3 times with 2 liters demineralized water.

The reactor was charged with 1.65 liter demineralized water and 6 g ammonium perfluorooctanoate. The reactor was sealed, pressured with nitrogen to 689 kPa (100 psig) and then vented to 0 kPa (0 psig). This pressure/venting cycle was repeated two times. The reactor was evacuated to −97 kPa (−14 psig) then purged with vinylidene difluoride (VF2) to 0 kPa (0 psig). This evacuation/purge cycle was repeated two times. At 0 kPa (0 psig) of VF2 in the reactor, 20 ml PSEPVE emulsion (containing 10 g PSEPVE, as prepared in Example 1) was injected into the reactor. The reactor contents were agitated at 200 rpm and heated to 60° C. The reactor was pressurized with VF2 to 2.07 MPa (300 psig) at which time 0.9 g potassium persulfate dissolved in 20 ml demineralized water was injected at 10 ml/min. The polymerization initiated in 0.06 hr. For stage-1 of the polymerization, a mixture of VF2 and PSEPVE (as PSEPVE emulsion containing 0.5 g PSPEVE/ml, as prepared in Example 1) in a 93:7 mole ratio was fed to the reactor at about the rate at which it was consumed maintaining about 2.07 MPa (300 psig) pressure in the reactor. The reaction was continued in this manner until about 125.5 g of PSEPVE were fed to the reactor to complete stage-1 of the polymerization. The mole ratio of VF2 to PSEPVE being fed to the polymerization was then changed to start stage-2 of the polymerization. For stage-2 of the polymerization, a mixture of VF2 and PSEPVE (as PSEPVE emulsion containing 0.5 g PSPEVE/ml, as prepared in Example 1) in a 3:1 mole ratio was fed to the reactor at about the rate at which it was consumed maintaining about 2.07 MPa (300 psig) pressure in the reactor. The reaction was continued in this manner until about an additional 89.5 g of PSEPVE were fed to the reactor to complete stage-2 of the polymerization. The overall reaction rate was about 142 g/hr. The reactor contents were cooled to ambient temperature, vented to 0 kPa (0 psig) and discharged as a milky-white polymer emulsion containing about 19 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield about 456 g of fluffy white polymer. DSC analysis showed a glass transition temperature at Tg=−29.8° C. at inflection and a well defined crystalline melting point at Tm=128.8° C. (ΔHf=15.7 J/g) on the second heat. F19nmr analysis of a polymer solution in perdeuterated dimethyl formamide was consistent with an average composition of the copolymer of 9.0 mole % PSEPVE and 91.0 mole % VF2. The polymer could be pressed into translucent white slabs and films at 200° C. that were clean and dense, free of voids or visible color. The fabricated polymer had the following tensile properties: initial modulus=50.3 MPa (7.3 Kpsi), tensile strength=14.5 MPa (2.1 Kpsi), elongation at break=394%.

In accord with the procedures of Example 2b, a 0.005 in. to 0.007 in. thick film was prepared from copolymer powder by melt pressing at 200° C. and converted to the sulfonic acid form. Proton ion conductivity was measured at ambient conditions according to the method of Sone et al, *J. Electrochem Soc* 143, 1254 (1996), and determined to be equal to 58×10−3 S/cm.

We claim:

1. A polymer composition comprising a polymer, I, or derivatives thereof selected from the group consisting of the alkali metal sulfonate, ammonium sulfonate, sulfonic acid, and sulfonyl methide, both acid and salt, said polymer, I, comprising monomer units Ia and Ib having the respective structures —(CF$_2$CH$_2$)$_u$(CF$_2$—CF—O—F$_f$—SO$_2$F)$_v$— wherein R$_f$ is a linear or branched perfluoroalkenyl or perfluoroalkenyl ether diradical, wherein said polymer I further comprises an amorphous segment and a crystalline segment, wherein said amorphous segment the ratio u:v is in the range of 85:15 to 50:50; and wherein said crystalline segment the ratio is in the range of 100:0 to 87:13; said polymer I being a copolymer of monomers IIa and IIb, CF$_2$=CH$_2$  IIa CF$_2$=CF—O—R$_f$—SO$_2$F  IIb said polymer I being characterized in that the melting point thereof lies above the melting point of a fully random copolymer of monomers IIa and IIb of the same overall composition, and lies at least 5° C. below the melting point of poly(vinylidene fluoride).

2. The polymer composition of claim 1 wherein the overall concentration of monomer units derived from monomer IIb in said polymer I is in the range of 6 mole % to 12 mole %.

3. The polymer composition of claim 1 wherein said amorphous segment the u:v ratio is in the range of 83:17 to 64:36.

4. The polymer composition of claim 1 wherein said crystalline segment the u:v ratio is in the range of 100:0 to 93:7.

5. The polymer composition of claim 1 wherein R$_f$ is

—CF$_2$CF(CF$_3$)—O—CF$_2$CF$_2$—

6. The polymer composition of claim 1, claim 2, or claim 5 wherein the polymer is an ionomer represented by the formula:

(CF$_2$CH$_2$)$_x$(CF$_2$—CF—O—R$_f$—SO$_3^-$$^+$M)$_y$ wherein M is alkali metal, ammonium, or hydrogen.

7. The polymer composition of claim 6 wherein M is lithium.

8. The polymer composition of claim 1, claim 2, or claim 5 wherein the polymer is an ionomer represented by the formula:

(CF$_2$CH$_2$)$_u$(CF$_2$—CF—O—R$_f$—SO$_3^-$$^+$M)$_v$ wherein M is alkali metal or hydrogen.

9. The polymer composition of claim 8 wherein M is lithium.

10. The polymer composition of claim 6 further comprising a polar liquid.

11. The polymer composition of claim 10 wherein M is hydrogen and the liquid is water or alcohol.

12. The polymer composition of claim 10 wherein M is lithium and liquid is an organic carbonate.

13. The polymer composition of claim 8 further comprising a polar liquid.

14. The polymer composition of claim 13 wherein M is hydrogen and the liquid is water or alcohol.

15. The polymer composition of claim 13 wherein M is lithium and the liquid is an organic carbonate.

16. An electrochemical cell comprising an anode, a cathode, and a separator wherein at least one of said anode, cathode, or separator comprises the ionomer of claim 6.

17. An electrochemical cell comprising an anode, a cathode, and a separator wherein at least one of said anode, cathode, or separator comprises the ionomer of claim 8.

18. A process, the process comprising combining the monomer IIb at a concentration of 0.2 to 0.6 g/ml with water and a fluorosurfactant and agitating said combination to form an emulsion having a droplet size of no greater than 0.5 micrometers;

in a reaction vessel, combining in water said emulsion with monomer IIa at a first monomer concentration ratio and a free-radical initiator;

allowing said monomers to polymerize to form a first copolymer which may be amorphous or crystalline;

in a reaction vessel which may be the same or different, combining in water said first copolymer with an additional amount of said emulsion of monomer IIb and an additional amount of monomer IIa, at a second monomer concentration ratio, and an additional amount of a free radical initiator, and allowing said further amounts of monomer to polymerize to form a second copolymer, said second copolymer being crystalline if said first copolymer is amorphous and said second copolymer being amorphous if said first copolymer is crystalline;

wherein said first and second concentration ratios of monomer IIa to monomer IIb are in the range of 85:15 to 50:50 on a molar basis when the desired copolymer is amorphous, and in the range of 100:0 to 87:13 when the desired copolymer is crystalline.

19. The process of claim 18 further comprising controlling the ratio of amorphous polymer concentration to crystalline polymer concentration so that the overall concentration of monomer units derived from monomer IIb is in the range of 6–12 mole %.

20. The process of claim 18 wherein said first and second concentration ratios of monomer IIa to monomer IIb are in the range of 83:17 to 64:36 on a molar basis when the desired copolymer is amorphous, and in the range of 100:0 to 93:7 when the desired polymer is crystalline.

21. The process of claim 18 wherein wherein $R_f$ is

—CF$_2$CF(CF$_3$)—O—CF$_2$CF$_2$—

22. The process of claim 18 further comprising hydrolyzing the product thereof to form an ionomer.

23. A polymer composition comprising a polymer, I, or derivatives thereof selected from the group consisting of the alkali metal sulfonate, ammonium sulfonate, sulfonic acid, and sulfonyl methide, both acid and salt, said polymer, I, comprising monomer units Ia and Ib having the respective structures —(CF$_2$CH$_2$)$_u$(CF$_2$—CF—O—R$_f$—SO$_2$F)$_v$— wherein $R_f$ is a linear or branched perfluoroalkenyl or perfluoroalkenyl ether diradical, said polymer I being a copolymer of monomers IIa and IIb, CF$_2$=CH$_2$      IIa CF$_2$=CF—O—R$_f$—SO$_2$F      IIb said polymer I being characterized in that the melting point thereof lies above the melting point of a fully random copolymer of monomers IIa and IIb of the same overall composition, and lies at least 5° C. below the melting point of poly(vinylidene fluoride);

said polymer I or derivatives thereof selected from the group consisting of the alkali metal sulfonate, ammonium sulfonate, sulfonic acid, and sulfonyl methide, both acid and salt, being prepared by a process comprising combining the monomer IIb at a concentration of 0.2 to 0.6 g/ml with water and a fluorosurfactant and agitating said combination to form an emulsion having a droplet size of no greater than 0.5 micrometers;

in a reaction vessel, combining in water said emulsion with monomer IIa at a first monomer concentration ratio and a free-radical initiator;

allowing said monomers to polymerize to form a first copolymer which may be amorphous or crystalline;

in a reaction vessel which may be the same or different, combining in water said first copolymer with an additional amount of said emulsion of monomer IIb and an additional amount of monomer IIa, at a second monomer concentration ratio, and an additional amount of a free radical initiator, and allowing said further amounts of monomer to polymerize to form a second copolymer, said second copolymer being crystalline if said first copolymer is amorphous and said second copolymer being amorphous if said first copolymer is crystalline;

wherein said first and second concentration ratios of monomer IIa to monomer IIb are in the range of 85:15 to 50:50 on a molar basis when the desired copolymer is amorphous, and in the range of 100:0 to 87:13 when the desired polymer is crystalline;

and, hydrolyzing polymer I when the desired product is an ionomer.

24. The polymer composition of claim 23 wherein the overall concentration of monomer units derived from monomer IIb in said polymer is in the range of 6 mole % to 12 mole %.

25. The polymer composition of claim 23 wherein $R_f$ is

—CF$_2$CF(CF$_3$)—O—CF$_2$CF$_2$—

26. The polymer composition of claim 23, claim 24, or claim 25 wherein the polymer is an ionomer represented by the formula:

(CF$_2$)CH$_2$)$_u$(CF$_2$—CF—O—F$_f$—SO$_3$$^{-+}$M)$_v$ wherein M is alkali metal, ammonium, or hydrogen.

27. The polymer composition of claim 26 wherein M is lithium.

28. The polymer composition of claim 23, claim 24, or claim 25 wherein the polymer is an ionomer represented by the formula:

(CF$_2$CH$_2$)$_u$(CF$_2$—CF—O—R$_f$—SO$_2$C(CN)$_2$$^{-+}$M)$_v$ wherein M is alkali metal or hydrogen.

29. The polymer composition of claim 28 wherein M is lithium.

30. The polymer of claim 23 wherein said process for preparing thereof further comprises controlling the ratio of amorphous polymer concentration to crystalline polymer concentration so that the overall concentration of monomer units derived from monomer IIb is in the range of 6–12 mole %.

31. The polymer of claim 23 wherein $R_f$ is

—CF$_2$CF(CF$_3$)—O—CF$_2$CF$_2$—

* * * * *